United States Patent [19]
Kessler

[11] 3,737,573
[45] June 5, 1973

[54] ULTRASONIC VISUALIZATION BY PULSED BRAGG DIFFRACTION

[75] Inventor: Lawrence W. Kessler, Glenview, Ill.
[73] Assignee: Zenith Radio Corporation, Chicago, Ill.
[22] Filed: Aug. 30, 1971
[21] Appl. No.: 175,954

[52] U.S. Cl. ............... 178/7.5 D, 73/67.5 R, 73/67.7, 340/5 MP, 178/DIG. 18
[51] Int. Cl. ... G01n 23/20, G01n 29/00, G01b 17/00
[58] Field of Search .......................... 178/7.3 D, 7.5 D, 178/DIG. 18; 250/199; 350/161, 162; 343/17; 73/67.7, 69, 67.5 H, 67.5 R; 340/5 MP

[56] References Cited
UNITED STATES PATENTS

| | | | |
|---|---|---|---|
| 3,685,008 | 8/1972 | Bhuta | 73/67.7 |
| 3,514,534 | 5/1970 | Korpel | 178/7.5 |
| 3,638,024 | 1/1972 | Chen et al. | 250/199 |
| 3,488,438 | 1/1970 | Korpel | 178/7.5 |
| 3,445,167 | 5/1969 | Armstrong et al. | 250/199 |
| 3,524,011 | 8/1970 | Korpel | 250/199 |

*Primary Examiner*—Robert L. Griffin
*Assistant Examiner*—John C. Martin
*Attorney*—John J. Pederson and John H. Coult

[57] ABSTRACT

An improvement in reflection mode Bragg display systems of the type wherein an acoustic beam is incident on an object which by reflection spatially modulates this sound field with its image information, a laser light beam interacts with such modulated sound field to undergo Bragg diffraction, thereby reproducing the image information in the diffracted light, and an optical system receiving such diffracted light images various desired cross sections of the object with a discrimination limited by the overall depth of focus of the optical imaging system. Control means are incorporated for delivering both the acoustic beam and the light beam in synchronized bursts of controlled duration to allow any of a plurality of cross-section within the acoustic depth of focus to be visualized, and spurious acoustic images eliminated, with a discrimination depth dependent on the duration of the acoustic burst. The light burst is delayed with respect to the initiation of the sound burst, and its duration limited, so as together to insure proper coincidence of the light with the sound energy reflected from the particular object plane selected for imaging.

10 Claims, 4 Drawing Figures

ULTRASONIC VISUALIZATION BY PULSED BRAGG DIFFRACTION

BACKGROUND OF THE INVENTION

The present invention pertains to display systems depending on Bragg interaction between light and ultrasonic waves to create the acoustic image of a cross-section of an object. More particularly, it pertains to improvements in such systems enabling the attainment of a much higher standard of imaging with such systems. As utilized herein, "light" includes radiation in both the visible and invisible portions of the spectrum and "sound" includes acoustic waves in both the audible and super-audible ranges.

Display systems employing the principle of Bragg diffraction imaging, although relatively new, have become well-known in the art and are now being applied more widely to such uses as non-destructive testing and medical diagnosis in real time. In general, the object to be visualized is illuminated with sound waves, which are thereby impressed with spatial modulation representative of the object to form a three-dimensional sound field. Different cross-sections of this field, representative of cross-sections of the object, may be observed by a mere change in optical adjustment.

However, for many applications the technique has been of limited use only because the optics of every system limit the degree of discrimination or the "thickness" of the visualized cross-section, to that of the depth of field or depth of focus of the optics. The usefulness of Bragg display systems has also been further compromised because of the lack of satisfactory means of eliminating the various forms of masking images which confuse or degrade the desired image, as well as the lack in reflection-mode Bragg devices of a more satisfactory way to eliminate image degradation to the proximity of non-information-bearing sound traveling toward the object to be visualized.

Accordingly, it is a general object of the invention to provide a superior Bragg-interaction display system.

Another object of the present invention is to provide a Bragg display system which eliminates masking of the desired image due to spurious images.

It is a more particular object to provide a Bragg display system which allows much greater depth discrimination by resolving many more cross-sections than in prior systems.

SUMMARY OF THE INVENTION

In accordance with the invention, light-sound interaction apparatus utilizing a laser light beam comprising a Bragg light-sound interaction cell including a sound-conducting medium and means for propagating wavefronts of sound energy within the medium, and means for projecting into the interaction cell the laser light beam to obtain Bragg light-sound interaction. Also provided are means for repetitively pulsing the sound energy in bursts of predetermined duration, and means for repetitively pulsing the laser light beam in bursts of predetermined duration.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements and in which:

DESCRIPTION OF THE PREFERRED EMBODIMENTS

Figure 1:
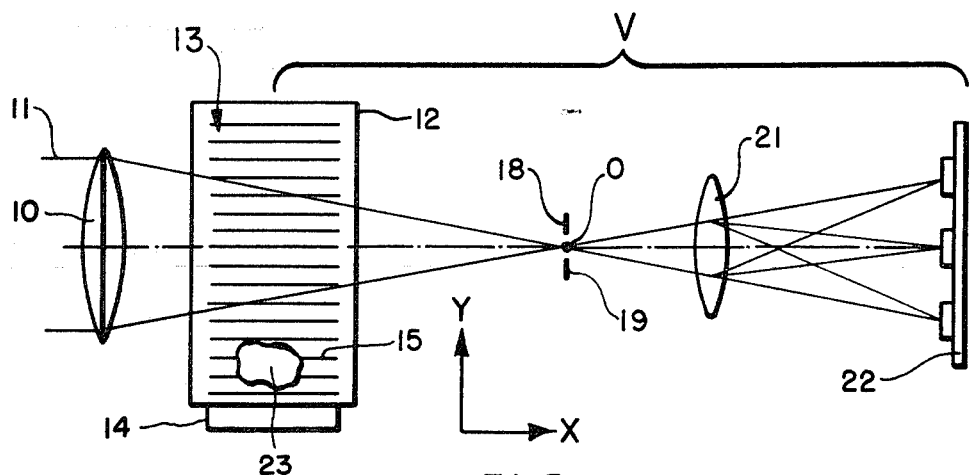
FIG. 1 illustrates schematically a typical known Bragg-interaction display system.

FIG. 1 illustrates in schematic form a typical Bragg ultrasonic display system as is described in more detail in U. S. Pat. No. 3,488,438 to A. Korpel and assigned to the same assignee as the present application. Cylindrical lens 10 teceives monochomatic coherent light beam 11 of wavelength λ and forms it into a wedge of light which passes through soundcell 12 and comes to a line focus at 0, perpendicular to the plane of the drawing. Soundcell 12 is a transparent-sided enclosure containing a transparent light conducting and sound conducting medium 13 such as water and having a transducer 14 attached at one end. Transducer 14 is driven by an RF signal to set up a series of ultrasonic soundwaves 15 which propagate across the path of the monochomatic light beam 11.

The light beam within soundcell 12 interacts with the sound wavefronts 15 to result in upshifted and downshifted Bragg diffraction images 18 and 19 above and below 0, which constitutes the zero order. These each contain an optical replica of the spatial sound distribution of a particular cross-sectional thickness of the sound-conducting medium transverse to the propagation direction of the soundwaves. The wedge-shaped converging light beam within the cell may be considered to comprise a plurality of light wavefronts with a wide distribution of angular orientation, enabling all the sound wavefronts 15 to undergo interactions with the lgiht which satisfy the Bragg relationship:

$$\sin \alpha = \pm \lambda / 2\Lambda$$

where $\pi/2 \pm \alpha$ is the angle between light and sound wavefronts and $\Lambda$ is the wavelength of the sound. In typical applications, the actual value of angle $\alpha$ is sufficiently small so that the sine of the angle is equal to the angle itself.

The upshifted and downshifted Bragg images 18 and 19 as well as the zero order light at 0 are now projected by cylinder lens 21 to screen 22. If we adapt as our direction conventions, X for the horizontal direction in the plane of the drawing, and Z for the vertical direction in the plane of the drawing Y perpendicular to the plane of the drawing, then the aixs fo the light beam through the cell lies in the X direction, while the sound propagation path lies in the Z direction. The images 18 and 19 lie in an Y-Z plane and are demagnified in the Z direction by the ratio $\Lambda/\lambda$ as compared to no demagnification in the Y direction. This Z direction demagnification is an inherent astigmatic property of Bragg diffraction imaging which must be compensated by the projection system. Extending the imaging rules to the three-dimensional case, i.e., allowing variation in the Y direction of the sound field, it has been found that the X and Y foci are not superimposed at the location of images 18 or 19. For downshifted image 18, however, these can be superimposed on projection screen 22 by proper selection of the projection lens system and the screen distance from the soundcell. Thus, in FIG. 1 screen 22 is placed at a distance V in the positive X direction from the soundcell such that the Y dimension of image 18 is in focus, while cylindrical lens system exemplified by lens 21, is chosen to magnify the X direction of the Bragg images by a factor $\Lambda/\lambda$ complementary to the inherent demagnification while simultaneously focusing the Y detail with the X detail at screen 22. With an object 23 now inserted into cell 12 for examination and lying between transducer 14 and the light beam 11, a modulation of the spatial sound distribution within the medium occurs representative of that object, and in this manner, a particular cross-sectional thickness of object 23 will be visualized at screen 22. To image other such object thicknesses, lens system 21 is simply translated slightly in the X direction. Of course, such optical probing of the object inevitably is limited by such considerations as depth of field, so that various cross sections within the object may be visualized only within certain limits of discrimination inherent in the optics of projection.

Figure 2:
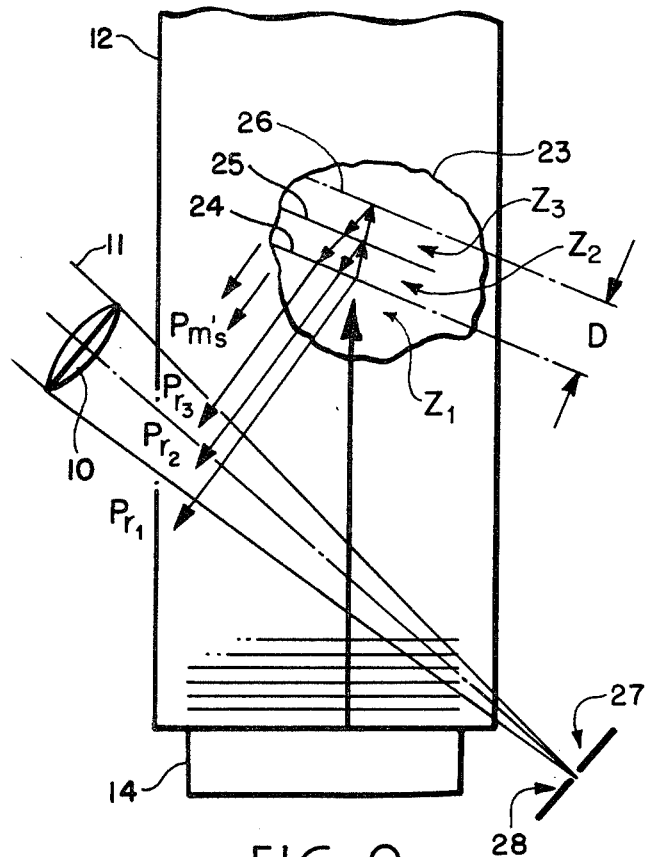
FIG. 2 is a schematic view of reflection-mode Bragg-interaction display, with details of the light-sound interaction.

It is convenient to refer to the Bragg visualization system schematically illustrated in FIG. 2 to further analyze such limitations. The elements of the system are the same as before, including an object 23, soundcell 12 driven at the same manner, and light beam 11 focused by cylindrical lens 10, except the system is now operated in the reflection rather than the transmission mode; i.e., the ultrasound which undergoes imaging interaction with light beam 11 is reflected from, rather than transmitted through, object 23. Object 23 may be conveniently analyzed as a collection of a large number of cross-sectional laminae of different acoustic impedances. Exemplary ones of such impedance cross-sections, which are parallel to each other but not necessarily planar, are schematically shown in the figure and denominated 24, 25 and 26, with different acoustic impedances $Z_1$, $Z_2$ and $Z_3$, respectively, and separated by a corresponding number of impedance boundaries. This assumption, while simplifying the analysis, also corresponds to the configuration of many actual physical objects. In accordance with the reflective mode, the object and sound field are oriented in such a way that most of the sound energy incident on the object is reflected over a path which is at an angle from the incident acoustic beam path. The nominal direction of the light beam is positioned so as to form upshifted and downshifted Bragg images 27 and 28 due only to the reflected sound wavefronts, and not the sound wavefronts incident on the object, since the latter will not be oriented at the proper Bragg angle. Since each of the impedance boundaries corresponding to the impedance cross-sections 24, 25 and 26 acts as an imperfect acoustic reflector, reflected ultrasonic energy $p_{r_1}$, $p_{r_2}$, $p_{r_3}$, etc., respectively, originating from each of the boundaries will pass through the light-sound interaction region of the cell 12. Hence, theoretically it should be possible to image separately each of the corresponding impedance cross-sections. But such is not the case, because of the limiting factor which the optical depth of focus D constitutes; it is always large enough so that a plurality of such boundaries 24, 25 and 26, and corresponding impedance cross-sections, are in focus simultaneously. In other words, each of the cross-sectional thicknesses imaged by the use of either the FIG. 1 or the FIG. 2 systems, even of quite small thickness, will contain a plurality of such impedance boundaries and cross-sections. This is schematically illustrated in the figure, with the exemplary impedance cross-sections 24, 25 and 26, within the depth of focus D, together with their associated impedance boundaries.

Thus the reflected ultrasonic energy $p_{r_1}$, $p_{r_2}$ and $p_{r_3}$ 09 from each of the boundaries so included is simultaneously visualized at 27 and 28, the images being superposition of the images of the impedance cross-sections included in the depth of focus; separate imaging of any of such cross-sections, without masking images from others, is impossible, as all are simultaneously in focus. In addition to such masking caused by the presence of multiple impedance boundaries within the depth of focus, further masking also comes about due to multiple reflections of ultrasonic energy ($p_m$'s in the figure) within the object material between the impedance boundaries, which cause additional emergent sound images of the same impedance cross-sections. The image associated with one or the other of such cross-sections may predominate over the others in an unpredictable fashion, depending on the relative efficiency of the corresponding boundaries as acoustic reflectors. It should also be pointed out that $p_{r_1}$, $p_{r_2}$ and $p_{r_3}$ are parallel and will remain so even if the object is rotated with respect to the sound field; thus, changing the angle of illumination will not necessarily allow further discrimination.

Figure 3:
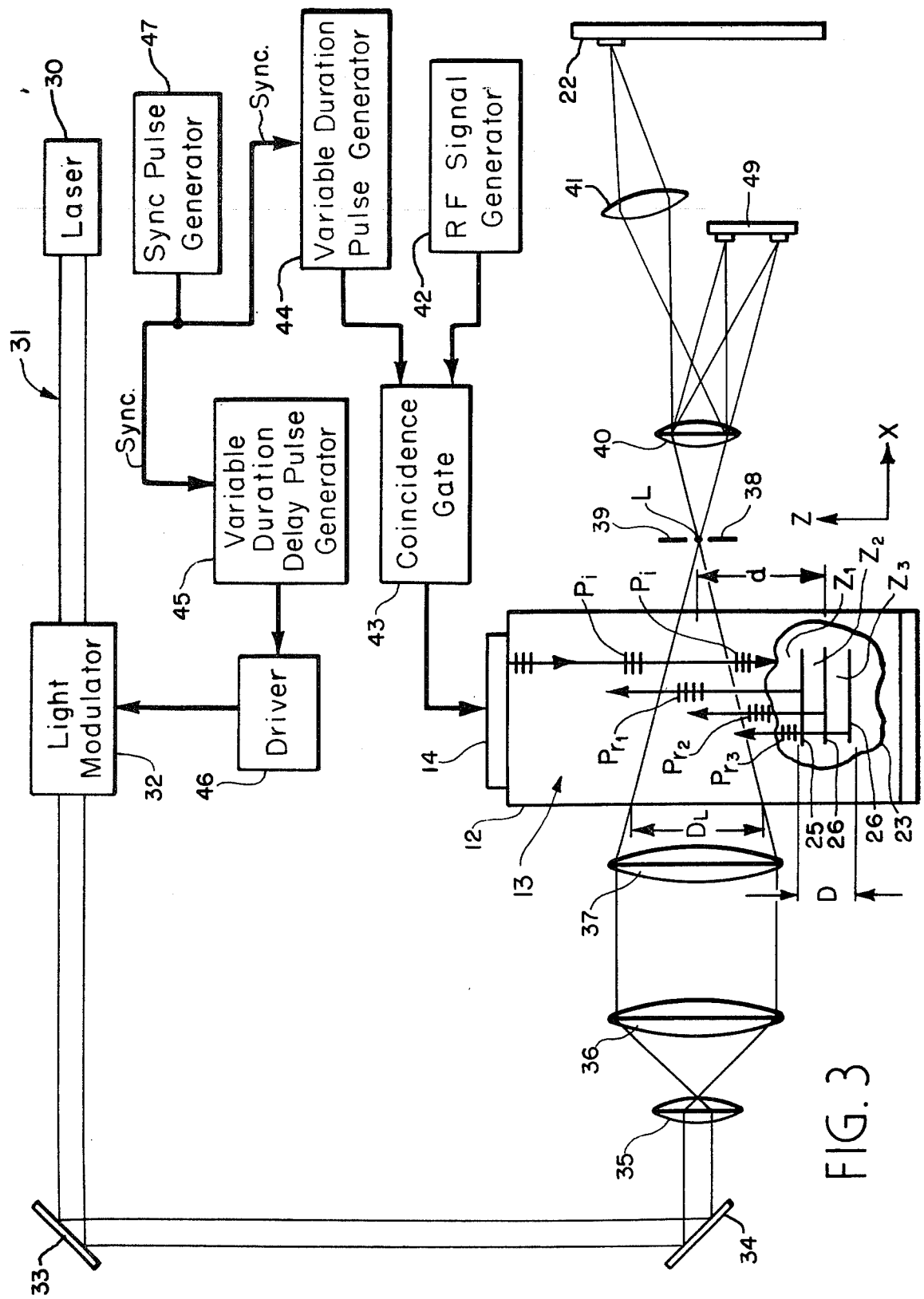
FIG. 3 is a schematic diagram of one embodiment of the invention.

The display system of FIG. 3 obviates such masking and interference, since it is capable of separating the images of impedance cross-sections within the optical depth of focus (see also FIG. 3) and thereby discriminating within a given depth such as D many more cross-sectional images of an object to be examined. The system includes a laser 30 acting as a source of a monochromatic coherent light beam 31 which is directed through a light modulator 32 of conventional design acting as a shutter to block the beam or allow it to pass in response to a command signal. Beam 31 then is directed by mirrors 33 and 34 through a beam diameter-expanding telescope arrangement comprising spherical lenses 35 and 36 to cylindrical lens 37 which, as in FIG. 1, forms the beam into a wedge of light and directs it through the soundcell 12 so that upshifted and downshifted Bragg images 38 and 39 are formed, above and below the beam's line focus at L, which is perpendicular to the plane of the drawing. The optical system for magnifying and projecting these images to screen 22, comprising cylindrical lenses 40 and 41, functions like the lens 21 of FIG. 1, the extra lens being simply to provide more magnification while conserving space. Soundcell 12 is, as before, a transparent-sided enclosure containing a transparent light-conducting medium 13 such as water and having a transducer 14 attached at one end. However, unlike FIG. 1, the soundcell is operated in the reflection mode, with object 23 at the end of the enclosure opposite that of the transducer 14; alternatively the object may be oriented as shown in FIG. 2.

The transducer 14 is driven by RF driving signals to set up a series of soundwaves propagating through the soundcell toward the object to be reflected by the object. Both the incident and reflected soundwaves pass through the path of the light wedge but unlike the reflection-mode visualization system of FIG. 2, the object does not have to be rotated to reflect the sound energy over a path which does not overlap the incident sound energy.

This gives rise to yet another problem of masking of a desired impedance cross-section image of the object by an unwanted image such as described in above connection with FIG. 2. Both incident and reflected sound energy may undergo Bragg light-sound interactions with the light beam to produce overlapping images, with the image due to the sound traveling toward the object 23 masking the image due to the acoustic energy reflected by the object. All such spurious images, whether arising from the incident sound energy, from reflections from impedance cross-sections which are not desired to be visualized, or from multiple internal reflections, have one distinguishing aspect, and that is the fact that the sound energy giving rise to each type of spurious image arrives in the light-sound interaction region at a time different from that of the impedance cross-section which is desired to be visualized.

Returning now to FIG. 3 to complete the description of that system, we demonstrate how such masking effects are eliminated by exploiting this characteristic of temporal difference between the sound energy corresponding to such effect and, the sound energy from the desired impedance cross-section. The RF driving signal for transducer 14 is furnished by an RF signal generator 42 through a coincidence gate 43. The latter also receives a command pulse from a variable duration pulse generator 44, and thus the output of the gate 43 to the transducer 14 consists of a burst of RF driving signal for every pulse of generator 44, of the same duration as that pulse. Thus bursts of sound energy of duration identical to that of the pulse from generator 44 are set up in the cell and propagate toward object 23. Variable duration-and-delay pulse generator 45 also furnishes command pulses of variable duration which operate light modulator 32 through an amplifying driver 46. Both pulse generators are connected to receive synchronization pulses from a synchronization pulse generator 47 and respond to emit their respective command pulses in synchronization, so that for example, successive pulses of both generators 44 and 45 may be adjusted to begin at the same moment. However, generator 45 also includes a variable delay, by which command pulses to the light modulator may be initiated with a variable time delay with respect to the delivery of respective companion pulses to transducer 14 from generator 44.

In operation, bursts of sound energy $P_i$ are directed in the $-Z$ direction by transducer 14 to be incident on the object 23. As in FIG. 3, the object 23 may be analyzed as a collection of a large number of cross-sectional laminar or (not necessarily planar) slices of different sound impedance with corresponding impedance boundaries; and for convenience, the same notation and analysis will now be used for FIG. 3, with exemplary impedance cross-sections 24, 25 and 26, again within the same depth of focus D. Each of the impedance cross-sections in response to an arriving sound burst $P_i$ from transducer 14 reflects acoustic energy packets bearing image information as to that cross section. Since the round-trip distance, (in the Z direction) which such a reflected packet must travel, varies with the depth of its impedance cross section, i.e., its distance in the Z direction from transducer 14, the reflected sound energy packets $p_{r_1}$, $p_{r_2}$, $p_{r_3}$ respectively, from each of the exemplary impedance cross-sections 24, 25 and 26 within the depth of focus D will reach the region of the light beam path at respective different times as measured from the initiation of the parent acoustic pulse $P_i$. Thus, $p_{r_1}$ arrives first after a time $t_1$, and the other reflected energy packets are delayed relative to the first to arrive at respective times $t_2$ and $t_3$ in accordance with the depth of the impedance boundary from which they are reflected.

Then, if it is desired to image impedance cross-section 25 of the object, for example, generator 45 is adjusted to delay the initiation of the light pulse with respect to its companion sound burst $P_i$ by an increment corresponding to the time $t_2$ necessary for acoustic energy due to this pulse to travel from the transducer 14 to the impedance boundary and by reflection from the desired cross section corresponding to cross-section 25 back to the light-sound interaction region. This time is, of course, unique and as long as this delay between the initiation of the respective pulses is maintained, light will be present in the cell to interact with the sound only when the reflected sound energy packet from the desired impedance cross-section 25 is found at the light-sound interaction region, thereby imaging that cross section, yet excluding information in the image from other regions of the object. As in the FIG. 1 system, upshifted and downshifted Bragg diffraction images 38 and 39 of the desired object cross section are found immediately above and below the light beam focus L, which corresponds to the zero order. After imaging through the first lens 40 of the magnification and projecting optics, an opaque stop 49 blocks the zero and upshifted images, allowing only the downshifted image 39 to proceed to lens 41 for display on screen 22.

For visual observations, the sound bursts $P_i$ are generated at a repetition rate which is high enough so that the image appears to the eye to be continuously present upon the screen 22. However, if the reflected-sound path of interest coincides with that of the incident sound energy, care must be taken not to increase the repetition rate to the point that it becomes impossible to discriminate the desired reflected sound energy packet. With the rate kept within reasonable limits, values are easily found which permit the sound energy packets reflected from the cross section desired to be imaged to be discriminated by timing the light bursts to occur only when one of such packets is within the interaction region.

In order to obtain satisfactory discrimination and resolution of the desired impedance cross-section, it is important that not only the relative delay between the light and sound bursts be adjusted correctly for the depth of the impedance cross section desired to be visualized, but also that the diration $t_s$ of the sound burst $P_i$ be kept within certain limits. The duration $t_s$ of the sound burst is of course determinative of its physical length in the direction of propagation Z, and if this sound burst length exceeds or approaches the distance between two cross-sections sought to be discriminated, reflected sound information as to both will arrive in the light-sound interaction region at the same time, making it impossible to discriminate the desired cross-section by means of adjustment of the pulse delay of generator 45 as described above. Therefore, adjustment of generator 44 is carefully carried out to insure a pulse duration $t_s$ compatible with the degree of discrimination desired in the visualization of the impedance cross-sections. In this manner, a plurality of cross-sections within the depth of focus may be dsicriminated, which would not otherwise be visible. The optical system rerpresented by lenses 40 and 41 need only be refocused to place yet another entire region of the object within its depth of observation or focus, in order to discriminate and observe yet another like number of depths within the new focus.

Figure 4:
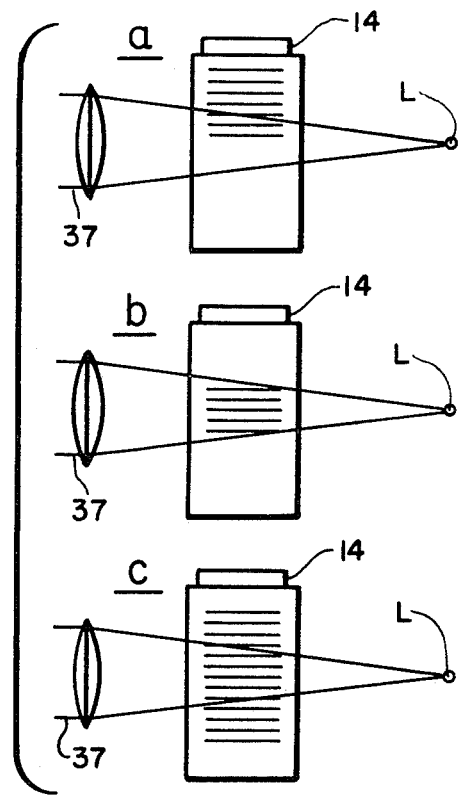
FIG. 4 is a schematic view of interactions between light and sound bursts helpful in understanding discrimination and resolution considerations.

Conversely, if the duration of the sound burst is too short, as is illustrated in FIG. 4b, the resolution of the image at screen 22 is degraded. As illustrated in FIG. 4a, this is also the case if the delay between respective pulses giving rise to the sound and associated light pulses is slightly incorrect, and if the light pulse duration allows the beam to persist beyond the time when a substantial fraction of the sound pulse is still present in the interaction region. Therefore the command signal pulse duration of generator 44, as well as the delay of generator 45, is adjusted so that the light beam goes ON only when a substantial predetermined fraction of the reflected sound energy packet from the desired cross section is squarely within the interaction region, and remains ON only while this condition obtains. This ideal situation of the interaction region is illustrated with FIG. 4c, for convenience of comparison to the less desirable FIG. 4a and 4b situations. On specific analytic terms, if $P_s$ is the length of the reflected sound energy packet $p_r$ and if $D_L$ is the maximum width of the light beam within the interaction region, then the light burst duration $t_L$ for maximum resolution is:

$$t_L \leq P_s - D_L/V_s ,$$

where $V_s$ is the velocity of the sound in interaction medium 13 of cell 12.

As might be expected, the efficiency of the light-sound interaction within cell 12 is affected by some of the pulse delay and duration choices which must be made. For example, compression of the sound burst $P_t$ duration to obtain greater depth discrimination adversely affects efficiency and, as was seen above, resolution, since the reflected sound energy packet then may become too small to ever fill the light-sound interaction region completely. In such cases, the interaction region itself is made smaller by, for example, substituting for lens 37 another lens having a shorter focal length, and using a telescope arrangement, (lenses 35 and 36) which imposes a lesser beam expansion, to make the maximum wedge width of the light beam within the cell smaller.

The aforementioned Korpel paper has shown the maximum resolution $\Delta X$ in the horizontal $X$ direction to be given be $$\Delta X \approx (F/D_L)\Lambda$$

and the vertical direction resolution has been found to be of the order of $$\Delta Y \approx \Lambda/h \sqrt{d^2 + h^2}$$

where $F$ is the focal length of lens 37, $D_L$ is the maximum width of the light beam within the cell 12, $\Lambda$ is the wavelength of the sound in soundcell medium 13, $h$ is the maximum wedge height of the light beam within the cell, and $d$ is the distance in the Z direction from the nominal location of object 23 to the nominal path of the light. Because of the astigmatic nature of Bragg diffraction, the depth of focus D within cell 12 in the Z direction must be specified for both horizontal and vertical directions, and have been respectively derived as:

$$\Delta Z_x \approx 2\Lambda (F/D_L)^2$$

and $$\Delta Z_y \approx 2\Lambda/h^2 (h^2 + d^2)$$

In a typical system with $F/D_L \approx 10$ and a sound burst duration $t_s$ corresponding to 30 cycles of the excitation frequency, the number of impedance cross-sections N that can be individually and fully resolved in the Z direction for each placement of the optical components 40 and 41, is simply $\Delta Z_x$ or $\Delta Z_y$, whichever is smaller, divided by the length of the reflected sound energy packet $P_s$. Note that if under the following circumstances, $\Delta Z_x > \Delta Z_y$ and $\Delta X > \Delta Y$, N is constrained by $\Delta Z_y$; however, if the image resolution actually required for $\Delta Y$ is of the same order as $\Delta X$, then a certain latitude exists in determining N. With regard to the example, $\Delta X \approx 10\Lambda$ and $\Delta Z_x \approx 200\Lambda$. If $\Delta Z_y = \Delta Z_x$, then it follows that $N \approx 7$, and this result is independent of sound frequency.

Thus, with an exemplary FIG. 3 system having such an $F/D_L$ ratio and sound burst duration, the entire $\Delta Z_x$ depth resolution component of $200\Lambda$ is of course simultaneously in focus. Pulsing of the light and sound in the manner of the invention allows this depth resolution to be improved to the equivalent of the sound burst length, here $30\Lambda$, rather than being limited to $200\Lambda$ as it would be for the comparable prior-art CW imaging system exemplified in FIG. 1.

In more detail, a prototype FIG. 3 system operates at an excitation frequency at the transducer of soundcell 12 of 20 MHz, corresponding to a wavelength $\Lambda$ in the water medium 13 of cell 12 of 0.075 mm. Pulse generator 44 gives rise to a sound burst of duration of 1.5 $\mu$sec, corresponding to 30 sound cycles and a length $p_s$ for the reflected packet of 2.25 mm. F is 10 mm, while $D_L$ is 1 mm; $d$ is 10 cm and $h$ is 1 cm. The respective resolutions for the system are:

$$\Delta X = 0.75 \text{ mm} \qquad \Delta Y = 0.75 \text{ mm}$$

and the depth resolution components are:

$$\Delta Z_x = 15 \text{ mm} \qquad \Delta Z_y = 15 \text{ mm}$$

the duration of the light burst $t_L$ is adjusted by means of generator 45 for a maximum of 0.83 $\mu$sec. and the light beam width $D_L$ is smaller than the reflected sound packet length $p_s$, in agreement with the aforementioned criteria, and equation for $t_L$, for obtaining best resolution nd efficiency.

Illustrating the adjustment of the degree of delay on generator 45 between the initiation of the sound burst and that of the light burst is the practical application of the system to the examination of object 23. In this case it is a completely sealed vessel having walls 1 inch thick of material of sound velocity 6,000 m/sec, whose inside surface and internal structure must be checked for defects. The distance between the transducer and the wall of the vessel is 15 cm, with d being 10 cm, as has been seen. The first reflected sound energy packet, from the front surface of the vessel, reaches the interaction region at the time necessary for the sound to travel 25 cm, i.e., 167$\mu$sec. However, the reflection from the rear wall reaches the interaction region 175$\mu$sec after initiation of the sound burst. Therefore, to view the structure of the aluminum wall behind the front surface, the delay of pulse generator 45 is adjusted so that the light burst occurs between 167 $\mu$sec and 175 $\mu$sec after the sound burst, with different delays within this range utilized to view different depth cross-sections within the vessel.

The invention thus allows much greater depth discrimination than ever before possible, with many more cross-sections of the object resolvable than was the case with prior-art Bragg visualization system and their depth-of-focus optical limitations. At the same time the same principles of operation which enable greater depth discrimination also result in the gating out of spurious images from portions of the object which are not to be visualized. Thus the invention has accomplished a significant enhancement of the utility and scope of Bragg interaction visualization systems.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. Light-sound interaction apparatus utilizing a laser light beam and comprising:
   a Bragg light-sound interaction cell including a sound conducting medium and means for propagating wavefronts of sound energy within said medium;
   means for projecting into said cell said light beam to obtain Bragg light-sound interaction;
   means for repetitively pulsing said sound energy in bursts of predetermined duration;
   means for repetitively pulsing said light beam in bursts of predetermined duration; and
   means for coordinating said means for pulsing said sound energy and said means for pulsing said light beam for selecting a particular one of a plurality of available cross-sections of an object positioned in said medium.

2. A system for developing an optical image of a preselected cross-section of an object to be examined and utilizing a laser light beam, comprising:
   a light-sound interaction cell adapted to receive said object within said cell including a sound-conducting medium;
   means for propagating wavefronts of sound energy of predetermined wavelength in said medium to be incident on said object, said energy being at least partially reflected by said object along a path within said conducting medium;
   means for projecting said laser light beam across a portion of said path to obtain Bragg light-sound interaction between said light and said reflected sound energy, providing at least one Bragg diffraction optical image of said object;
   means for repetitively pulsing said sound energy in bursts or predetermined duration;
   and means synchronized to said sound pulsing means for repetitively pulsing said light beam in bursts or predetermined duration to obtain said light-sound interaction only during the presence within said laser-illuminated path portion of the sound energy reflected by said preselected object cross-section so that said optical image represents said preselected cross-section of said object.

3. A system as in claim 2, in which said system further includes an optical system for projecting said image upon on imaging surface, said optical system having a depth of focus within which said imaged cross-section lies.

4. A system as in claim 2, in which said optical system compensates the astigmatic demagnification of said image.

5. A system as in claim 3 in which the focus of said optical system may be moved to include different regions of the object within the depth of focus.

6. A system as in claim 2 in which for each sound burst a corresponding light burst is furnished, and in which said light pulsing means includes means for delaying the initiation of each light pulse with respect to the initiation of its corresponding sound burst.

7. A system as in claim 2 in which said reflection path coincides with the path of travel of said incident sound burst to said object, and in which the rate of repetition of said sound light bursts is such as to avoid Bragg-imaging of said incident sound burst.

8. A system as in claim 2 in which the duration of said sound burst is adjustable in accordance with the degree of discrimination dsired.

9. A system as in claim 2 in which said projecting means is adjustable to increase or decrease said laser-illuminated portion of said reflection path.

10. A system as in claim 6 in which said light burst is initiated and persists only with the presence within said laser-illuminated portion of said reflection path of a predetermined substantial fraction of the sound energy reflected by said imaged cross-section.

* * * * *